(12) United States Patent
Wang et al.

(10) Patent No.: US 11,448,916 B2
(45) Date of Patent: Sep. 20, 2022

(54) SMART GLASS AND LIGHT ADJUSTING METHOD THEREOF, LIGHT ADJUSTING DEVICE AND NON-TRANSITORY COMPUTER STORAGE MEDIUM

(71) Applicants: Beijing BOE Optoelectronics Technology Co., Ltd., Beijing (CN); BOE TECHNOLOGY GROUP CO., LTD., Beijing (CN)

(72) Inventors: Jiaxing Wang, Beijing (CN); Hongliang Yuan, Beijing (CN); Xiaojuan Wu, Beijing (CN); Qi Zheng, Beijing (CN); Yao Bi, Beijing (CN); Zhiqiang Zhao, Beijing (CN); Xuan Zhong, Beijing (CN); Zhangxiang Cheng, Beijing (CN); Donghua Zhang, Beijing (CN); Ce Wang, Beijing (CN)

(73) Assignees: Beijing BOE Optoelectronics Technology Co., Ltd., Beijing (CN); Beijing BOE Technology Development Co., Ltd., Beijing (CN)

( * ) Notice: Subject to any disclaimer, the term of this patent is extended or adjusted under 35 U.S.C. 154(b) by 0 days.

(21) Appl. No.: 17/242,435

(22) Filed: Apr. 28, 2021

(65) Prior Publication Data
US 2022/0075221 A1 Mar. 10, 2022

(30) Foreign Application Priority Data
Sep. 10, 2020 (CN) .......................... 202010949816.4

(51) Int. Cl.
E06B 9/24 (2006.01)
G02F 1/1333 (2006.01)
(Continued)

(52) U.S. Cl.
CPC ............ *G02F 1/13338* (2013.01); *E06B 9/24* (2013.01); *G02F 1/137* (2013.01); *G02F 1/1337* (2013.01);
(Continued)

(58) Field of Classification Search
CPC . G02F 1/13338; E06B 9/24; E06B 2009/2464
See application file for complete search history.

(56) References Cited

U.S. PATENT DOCUMENTS

2015/0342033 A1* 11/2015 Hasegawa ............ H05K 1/0268
349/150
2018/0067366 A1* 3/2018 Kimura ............ G02F 1/133514
(Continued)

*Primary Examiner* — Mariam Qureshi
(74) *Attorney, Agent, or Firm* — Houtteman Law LLC

(57) ABSTRACT

The present disclosure provides a smart glass and a light adjusting method, a light adjusting device and a non-transitory computer storage medium. The smart glass includes a first glass module, a touch control layer and a control unit. The first glass module includes a first substrate and a second substrate opposite to each other, and a first light adjusting layer between the first and second substrates. The light transmittance of the first light adjusting layer is adjusted by an electric field between the first substrate and the second substrate. The touch control layer is provided in at least one of the first substrate and the second substrate. The control unit is electrically coupled to the touch control layer to receive a touch control signal output by the touch control layer and adjust the electric field between the first substrate and the second substrate according to the touch control signal.

17 Claims, 7 Drawing Sheets

(51) Int. Cl.
    *G06F 3/041*         (2006.01)
    *G02F 1/1337*       (2006.01)
    *G02F 1/1339*       (2006.01)
    *G02F 1/1343*       (2006.01)
    *G02F 1/137*        (2006.01)
    *B60J 1/00*         (2006.01)
    *B60J 3/04*         (2006.01)

(52) U.S. Cl.
    CPC ...... *G02F 1/13392* (2013.01); *G02F 1/13439* (2013.01); *G02F 1/133345* (2013.01); *G02F 1/134309* (2013.01); *G06F 3/04164* (2019.05); *B60J 1/001* (2013.01); *B60J 3/04* (2013.01); *E06B 2009/2464* (2013.01)

(56) References Cited

U.S. PATENT DOCUMENTS

2019/0241050 A1*   8/2019   Okabe ................. G02F 1/13306
2019/0390512 A1*  12/2019   Iwahori ............... G02F 1/13318

* cited by examiner

SMART GLASS AND LIGHT ADJUSTING METHOD THEREOF, LIGHT ADJUSTING DEVICE AND NON-TRANSITORY COMPUTER STORAGE MEDIUM

CROSS-REFERENCE TO RELATED APPLICATIONS

The present application claims the priority of the Chinese Patent Application No. 202010949816.4, filed on Sep. 10, 2020 at the Chinese Intellectual Property Office, the content of which is incorporated herein by reference in its entirety.

TECHNICAL FIELD

The present disclosure relates to the technical field of smart glass, and particularly relates to a smart glass and a light adjusting method thereof, a light adjusting device and a non-transitory computer storage medium.

BACKGROUND

At present, a smart glass is applied to the fields of buildings, vehicles and the like. Light transmittance of the smart glass may be changed, such that the smart glass may have states switchable between a dark state and a bright state.

SUMMARY

According to one aspect of the present disclosure, a smart glass is provided. The smart glass includes a first glass module, a touch control layer and a control unit; wherein the first glass module includes a first substrate and a second substrate opposite to each other, and a first light adjusting layer between the first substrate and the second substrate, wherein light transmittance of the first light adjusting layer is adjusted by an electric field between the first substrate and the second substrate; the touch control layer is provided in at least one of the first substrate and the second substrate; and the control unit is electrically coupled to the touch control layer to receive a touch control signal output by the touch control layer and adjust the electric field between the first substrate and the second substrate according to the touch control signal.

In some embodiments, the first substrate includes a first base substrate and a first electrode layer on a side of the first base substrate proximal to the first light adjusting layer, the second substrate includes a second base substrate and a second electrode layer on a side of the second base substrate proximal to the first light adjusting layer, and the first electrode layer and the second electrode layer are electrically coupled to the control unit, respectively, and the touch control layer is between the first electrode layer and the first base substrate and/or between the second electrode layer and the second base substrate.

In some embodiments, the first electrode layer includes a first planar electrode completely covering the first base substrate, the second electrode layer includes a second planar electrode completely covering the second base substrate, and the first planar electrode and the second planar electrode are respectively electrically coupled to the control unit; and the touch control layer includes a touch control electrode electrically coupled to the control unit.

In some embodiments, the first electrode layer includes a plurality of first strip electrodes extending along a first direction and/or the second electrode layer includes a plurality of second strip electrodes extending along the first direction, and the plurality of first strip electrodes and the plurality of second strip electrodes are electrically coupled to the control unit, respectively.

In some embodiments, the touch control layer includes a plurality of touch control electrodes arranged at intervals; the smart glass further includes a plurality of touch control signal lines; and the plurality of touch control signal lines are electrically coupled to the plurality of touch control electrodes in a one-to-one correspondence, the plurality of touch control electrodes are electrically coupled to the control unit via the plurality of touch control signal lines, and the number of the plurality of touch control electrodes is equal to or less than the number of the first strip electrodes and the number of the second strip electrodes.

In some embodiments, an orthographic projection of one of the plurality of touch control electrodes on the first base substrate overlaps with an orthographic projection of at least one of the plurality of first strip electrodes on the first base substrate, and/or an orthographic projection of one of the plurality of touch control electrodes on the second substrate overlaps with an orthographic projection of at least one of the plurality of second strip electrodes on the second base substrate.

In some embodiments, an orthographic projection of one of the plurality of touch control electrodes on the first base substrate overlaps with an orthographic projection of corresponding one of the plurality of first strip electrodes on the first base substrate, and/or an orthographic projection of one of the plurality of touch control electrodes on the second base substrate overlaps with an orthographic projection of corresponding one of the plurality of second strip electrodes on the second base substrate.

In some embodiments, the first electrode layer includes a plurality of first strip electrodes extending along the first direction, the second electrode layer includes a planar electrode completely covering the second base substrate, and the touch control layer is between the plurality of first strip electrodes and the first base substrate.

In some embodiments, the first electrode layer includes a plurality of first strip electrodes extending along the first direction, the second electrode layer includes a plurality of second strip electrodes extending along the first direction, the touch control layer includes a first touch control sub-layer including a plurality of first touch control electrodes extending along the first direction and a second touch control sub-layer including a plurality of second touch control electrodes extending along the first direction, and the first touch control sub-layer is between the plurality of first strip electrodes and the first base substrate, and the second touch control sub-layer is between the plurality of second strip electrodes and the second base substrate.

In some embodiments, orthographic projections of the plurality of first strip electrodes on the first base substrate or the second base substrate, orthographic projections of the plurality of second strip electrodes on the first base substrate or the second base substrate, orthographic projections of the plurality of first touch control electrodes on the first base substrate or the second base substrate, and orthographic projections of the plurality of second touch control electrodes on the first base substrate or the second base substrate overlap with each other in one-to-one correspondence.

In some embodiments, the first substrate further includes: a first insulating layer between the first electrode layer and the touch control layer; a second insulating layer on a side of the first electrode layer proximal to the first light adjusting layer; and a first alignment layer on a side of the second insulating layer proximal to the first light adjusting layer, the second substrate further includes: a second alignment layer on a side of the second electrode layer proximal to the first light adjusting layer; and the smart glass further includes a spacer in the first light adjusting layer.

In some embodiments, the smart glass further includes a light adjusting region and a non-light adjusting region, wherein the touch control layer is in the light adjusting region, and the control unit is in one of the first and second substrates and in the non-light adjusting region.

In some embodiments, the smart glass further includes a first transmission line and a sealant, wherein the first transmission line and the control unit are both in one substrate of the first substrate and the second substrate, the first transmission line surrounds the corresponding electrode layer in the one substrate where the first transmission line is located, and the first transmission line is electrically coupled to the control unit; and the sealant is between the first substrate and the second substrate and encapsulates the first light adjusting layer, and the sealant includes a conductive material and is electrically coupled to the first transmission line and the corresponding electrode layer of the other substrate of the first substrate and the second substrate in which the first transmission line is not located.

In some embodiments, the first light adjusting layer is a dye liquid crystal layer.

In some embodiments, the plurality of touch control electrodes is made of indium tin oxide.

According to another aspect of the present disclosure, a smart glass is provided. The smart glass includes at least one first glass module and at least one second glass module, wherein each of the at least one first glass module comprises a first substrate and a second substrate opposite to each other, and a first light adjusting layer between the first substrate and the second substrate, wherein light transmittance of the first light adjusting layer is adjusted by an electric field between the first substrate and the second substrate; the smart glass further comprises a touch control layer and a control unit, the touch control layer is provided in at least one of the first substrate and the second substrate; and the control unit is electrically coupled to the touch control layer to receive a touch control signal output by the touch control layer and adjust the electric field between the first substrate and the second substrate according to the touch control signal, the at least one first glass module includes at least two first glass modules stacked with each other, and the at least one second glass module is stacked with each other and is between two adjacent first glass modules of the at least two first glass modules, or the at least one first glass module includes one first glass module, and the at least one second glass module is stacked with each other and on a side of the first glass module, wherein each of the at least one second glass module includes a third substrate and a fourth substrate opposite to each other, and a second light adjusting layer between the third substrate and the fourth substrate, the second light adjusting layer is a dye liquid crystal layer, and each of the at least one second glass module does not include a touch control layer; the touch control layer of the smart glass is in the first substrate and/or the second substrate of the at least one first glass module exposed from the stacked at least one first glass module and at least one second glass module; and the two adjacent second glass modules share a same base substrate, and the second glass module and the first glass module adjacent to each other, share a same base substrate.

According to another aspect of the present disclosure, a method for light adjusting of a smart glass is provided. The smart glass includes a first glass module, a touch control layer and a control unit; wherein the first glass module includes a first substrate and a second substrate opposite to each other, and a first light adjusting layer between the first substrate and the second substrate, wherein light transmittance of the first light adjusting layer is adjusted by an electric field between the first substrate and the second substrate; the touch control layer is provided in at least one of the first substrate and the second substrate; and the control unit is electrically coupled to the touch control layer to receive a touch control signal output by the touch control layer and adjust the electric field between the first substrate and the second substrate according to the touch control signal, the method includes the following steps: receiving, by the control unit, the touch control signal output by the touch control layer; generating, by the control unit, a light adjusting voltage according to the touch control signal and a current light transmittance of the smart glass; and outputting, by the control unit, the light adjusting voltage to adjust an electric field between the first substrate and the second substrate.

In some embodiments, the first substrate includes a first base substrate and a first electrode layer on a side of the first base substrate proximal to the first light adjusting layer, the second substrate includes a second base substrate and a second electrode layer on a side of the second base substrate proximal to the first light adjusting layer, and the first electrode layer and the second electrode layer are electrically coupled to the control unit, respectively, wherein the touch control layer is between the first electrode layer and the first base substrate and/or between the second electrode layer and the second base substrate, generating, by the control unit, a light adjusting voltage according to the touch control signal and the current light transmittance of the smart glass includes: determining a touch position according to the touch control signal; determining a strip electrode to which a light adjusting voltage is output according to the touch positions and preset position relation between the touch position and the positions of the plurality of first strip electrodes or the plurality of second strip electrodes; and generating a different light adjusting voltage from the light adjusting voltage corresponding to current light transmittance of the light adjusting layer in the region where the determined strip electrode is located according to the current light transmittance of the light adjusting layer in the region where the determined strip electrode is located.

According to another aspect of the present disclosure, a device for light adjusting of a smart glass including a processor and a memory is provided, wherein the memory stores program instructions, and the processor executes the program instructions to perform the above method.

According to another aspect of the present disclosure, a non-transitory computer storage medium having program instructions stored thereon is provided, wherein when the program instructions executed on a computer, the computer performs the above method.

DETAILED DESCRIPTION

Figure 1:
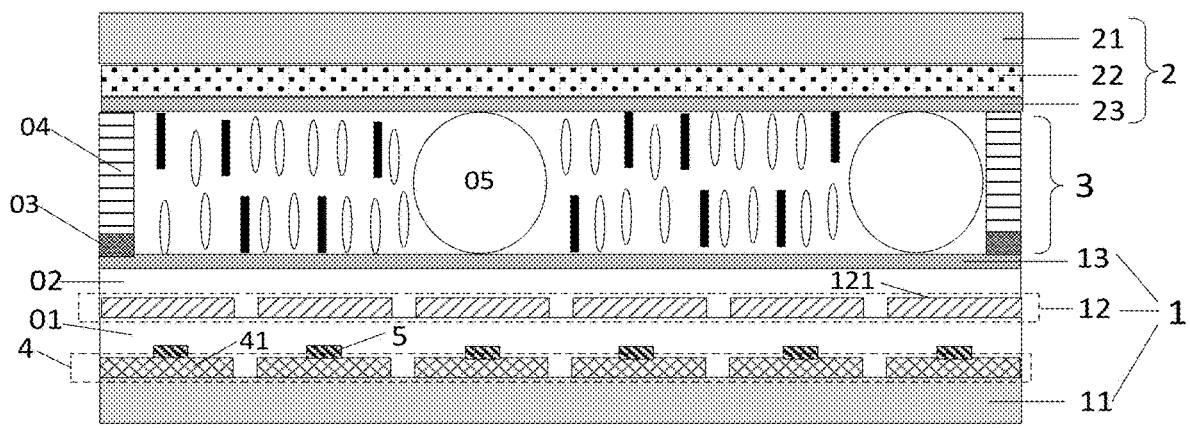
FIG. 1 is a cross-sectional view of a smart glass according to an embodiment of the present disclosure.

In order to make a person skilled in the art better understand the technical solutions of the present disclosure, the following detailed description is given with reference to the accompanying drawings and the specific embodiments.

The shapes and sizes of the components in the drawings are not to scale, but are merely intended to facilitate understanding of the contents of the embodiments of the present disclosure.

Unless otherwise defined, technical or scientific terms used herein shall have the ordinary meaning as understood by a person skilled in the art to which the present disclosure belongs. A term such as "first", "second", and the like used in the present disclosure is not intended to indicate any order, quantity, or importance, but rather is used for distinguishing between different elements. Similarly, "one", "a", "the" or any other similar word does not mean a quantity limit, but means that there is at least one. The word "comprise", "include", or the like, means that the element or item preceding the word contains the element or item listed after the word and its equivalents, but does not exclude the presence of any other element or item. The terms "connect", "couple" and the like are not limited to physical or mechanical connections, but may include electrical connections and the like, whether directly or indirectly. The terms such as "upper", "lower", "left", "right", and the like are used merely for indicating relative positional relationships, and when an absolute position of the object described is changed, the relative positional relationships may also be changed accordingly.

The present disclosure provides a smart glass including a first glass module, a touch control layer and a control unit.

Specifically, FIG. 1 is a cross-sectional view of a smart glass according to an embodiment of the present disclosure. The smart glass may include a first glass module. FIG. 1 illustrates an example of a smart glass including one first glass module. The first glass module includes a first substrate 1 (i.e., a lower substrate in FIG. 1) and a second substrate 2 (i.e., an upper substrate in FIG. 1) which are opposite to each other, and a first light adjusting layer 3 between the first substrate 1 and the second substrate 2. Light transmittance of the first light adjusting layer 3 may be adjusted according to an electric field generated between the first substrate 1 and the second substrate 2. The touch control layer 4 may be provided in at least one of the first substrate 1 and the second substrate 2 of the first glass module. For example, the touch control layer 4 may be provided between any two adjacent film layers in the first substrate 1, or the touch control layer 4 may be provided between any two adjacent film layers in the second substrate 2, or the touch control layer 4 may be provided between any two adjacent film layers in each of the first substrate 1 and the second substrate 2. The control unit IC is electrically coupled to the touch control layer 4. The control unit IC may receive a touch control signal output by the touch control layer 4, i.e., a touch control signal caused by a user touching the touch control layer 4, and adjust the electric field between the first substrate 1 and the second substrate 2 according to the received touch control signal, so as to adjust the light transmittance of the first light adjusting layer 3.

Since the touch control layer 4 is provided in at least one of the first substrate 1 and the second substrate 2, and the touch control signal of the touch control layer 4 is received by the control unit IC, the touch control signal may be input to the control unit IC by a user touching the region where the touch control layer 4 is located. Then, the control unit IC adjusts the light transmittance of the first light adjusting layer 3 according to the touch control signal, so as to realize light adjusting of the smart glass by touch control.

Optionally, as shown in FIG. 1, the first substrate 1 includes a first base substrate 11, and a first electrode layer 12 on a side of the first base substrate 11 proximal to the first light adjusting layer 3 (or the second substrate 2). The second substrate 2 includes a second base substrate 21, and a second electrode layer 22 on a side of the second base substrate 21 proximal to the first light adjusting layer 3 (or the first substrate 1). The first light adjusting layer 3 is provided between the first electrode layer 12 and the second electrode layer 22. The first electrode layer 12 and the second electrode layer 22 are electrically coupled to the control unit IC, respectively, and receive the voltages supplied from the control unit IC, so that an electric field is generated between the first electrode layer 12 and the second electrode layer 22. By changing the voltages applied to the first electrode layer 12 and the second electrode layer 22, the electric field therebetween may be changed. By changing the electric field between the first electrode layer 12 and the second electrode layer 22, the light transmittance of the first light adjusting layer 3 may be changed, so that the light transmittance of the first light adjusting layer 3 may be changed from 0% to 100%, and the smart glass may adapt to various scenes.

The touch control layer 4 may be provided between the first electrode layer 12 and the first base substrate 11, and/or between the second electrode layer 22 and the second base substrate 21. For example, the touch control layer 4 may be provided between the first base substrate 11 and the first electrode layer 12 in the first substrate 1, and/or the touch control layer 4 may be provided between the second base substrate 21 and the second electrode layer 22 in the second substrate 2. Certainly, the touch control layer 4 may also be provided between other film layers in the first substrate 1 and/or between other film layers in the second substrate 2, which is not limited herein.

Optionally, in the smart glass provided in the present embodiment, the first light adjusting layer 3 may include a plurality of types of light adjusting medium. For example, the first light adjusting layer 3 may be a dye liquid crystal layer. The dye liquid crystal layer includes liquid crystal molecules and dichroic dye molecules. The dichroic dye molecules have dichroic properties that only absorb light in the incident light parallel to the long axis of the dichroic dye molecules. Specifically, the liquid crystal molecules are driven in a twisted nematic (TN) mode as an example in the present disclosure, that is, the smart glass has a normally white display mode. Voltages are applied to the first electrode layer 12 and the second electrode layer 22, respectively, and a voltage difference capable of driving the liquid crystal molecules in the dye liquid crystal layer to deflect is generated therebetween. When no voltage is applied to the first electrode layer 11 and the second electrode layer 21, the liquid crystal molecules have deflection angle to make the liquid crystal molecules parallel to the first substrate 1, the dye molecules do not absorb light, the light transmittance of the first light adjusting layer 3 is close to 100%, and the smart glass is in a bright state. When voltages are applied to the first electrode layer 12 and the second electrode layer 22, the liquid crystal molecules have deflection angle to make the liquid crystal molecules approximately perpendicular to the first substrate 1, the dye molecules absorb light, the light transmittance of the first light adjusting layer 3 gradually decreases to approximately 0%, and the smart glass is in a dark state, as shown in FIG. 1. A dye liquid crystal layer is taken as an example of the first light adjusting layer 3 in the following.

Further, in each first glass module, a first alignment layer 13 is provided on a side of the first electrode layer 12 in the first substrate 1 proximal to the second substrate 2, and a second alignment layer 23 is provided on a side of the second electrode layer 22 in the second substrate 2 proximal to the first substrate 1. The first and second alignment layers 13 and 23 may align the liquid crystal molecules such that the liquid crystal molecules may maintain a uniform alignment direction in a case where no voltage is applied to the first and second electrode layers 12 and 22.

Further, spacers 05 are provided between the first substrate 1 and the second substrate 2. The spacers 05 support the first substrate 1 and the second substrate 2 such that the first substrate 1 and the second substrate 2 are spaced apart from each other by a certain distance to form a space for accommodating the liquid crystal molecules. The spacers may include a plurality of types, such as a ball spacer or a post spacer PS, which is not limited herein.

In some embodiments, as shown in FIG. 1, the second electrode layer 22 may include a second planar electrode covering the entire second base substrate 21. Similarly, the first electrode layer 12 may also include a first planar electrode covering the entire first base substrate 11. That is, both the first electrode layer 12 and the second electrode layer 22 may be planar electrodes. The first planar electrode and the second planar electrode are electrically coupled to the control unit IC, respectively. The touch control layer 4 includes a touch control electrode electrically coupled to the control unit IC. That is, when the smart glass is touched, the touch control electrode outputs a touch control signal. The control unit IC generates adjusting voltages according to the touch control signal, and sends the adjusting voltages to the first planar electrode and the second planar electrode, thereby changing the electric field between the first planar electrode and the second planar electrode, and further changing the light transmittance of the first light adjusting layer 3.

In some embodiments, as shown in FIG. 1, the smart glass provided in the embodiment further includes a plurality of touch control signal lines (TX lines) 5, and the touch control layer 4 includes a plurality of touch control electrodes 41 arranged at intervals. The touch control signal lines 5 are electrically coupled to the touch control electrodes 41 in a one-to-one correspondence. The plurality of touch control signal lines 5 are respectively on a side of the touch control electrodes 41 proximal to the first electrode layer 12. The plurality of touch control electrodes 41 are electrically coupled to the control unit IC via the plurality of touch control signal lines 5. That is, one touch control signal line 5 is coupled to and between the control unit IC and the corresponding touch control electrode 41, and one touch signal line 5 corresponds to one touch control electrode 41. When a user touches one of the touch control electrodes 41, the touch control signal line 5 coupled to the touch control electrode 41 transmits a touch control signal of the touch control electrode 41 to the control unit IC. The control unit IC is preset with a light adjusting action corresponding to the touch on each touch control electrode 41. The control unit IC may send corresponding light adjusting voltages according to the preset light adjusting action corresponding to the touch control signal sent by the touch control electrode 41, so as to adjust the light transmittance of the first light adjusting layer 3.

In some embodiments, the first electrode layer 12 includes a plurality of first strip electrodes extending along a first direction, and/or the second electrode layer 22 includes a plurality of second strip electrodes extending along the first direction. The plurality of first strip electrodes and the plurality of second strip electrodes are electrically coupled to the control unit IC, respectively. That is, only the first electrode layer 12 includes a plurality of first strip electrodes extending in the first direction, or only the second electrode layer 22 includes a plurality of second strip electrodes extending in the first direction, or the first electrode layer 12 and the second electrode layer 22 include a plurality of first strip electrodes and a plurality of second strip electrodes extending in the first direction, respectively. The control unit IC may control the plurality of first strip electrodes in the first electrode layer 12 and/or the plurality of second strip electrodes in the second electrode layer 22, respectively. Hereinafter, the touch control layer 4 between the first electrode layer 12 and the first base substrate 11 is taken as an example, and the touch control layer 4 between the first electrode layer 12 and the first base substrate 11 is referred to as a first touch control sub-layer. Accordingly, the first touch control sub-layer is electrically coupled to the control unit IC via the first touch control signal line 5, and the touch control electrodes in the first touch control sub-layer is referred to as first touch control electrodes 41. It should be noted that the first direction may be any direction, such as a vertical direction, a horizontal direction, and the like, and the direction shown in FIG. 3 is taken as an example of the first direction in the embodiment for description.

Further, the first touch control electrodes 41 in the first touch control sub-layer 4 may cover the entire region where the first light adjusting layer 3 is located, or may cover a portion of the region where the first light adjusting layer 3 is located. The region where the first touch control electrodes 41 are located is referred as a touch region of the smart glass. The region where the first light adjusting layer 3 is located is referred as a light adjusting region, and the first touch control signal line 5 is a metal line. In order not to affect the light transmittance of the first light adjusting layer 3, the first touch control signal line 5 may be provided in a non-light adjusting region other than the light adjusting region where the first light adjusting layer 3 is located, that is, there is no overlapping region between an orthographic projection of the first touch control signal line 5 on the first base substrate 11 and an orthographic projection of the first light adjusting layer 3 on the first base substrate 11.

Figure 3:
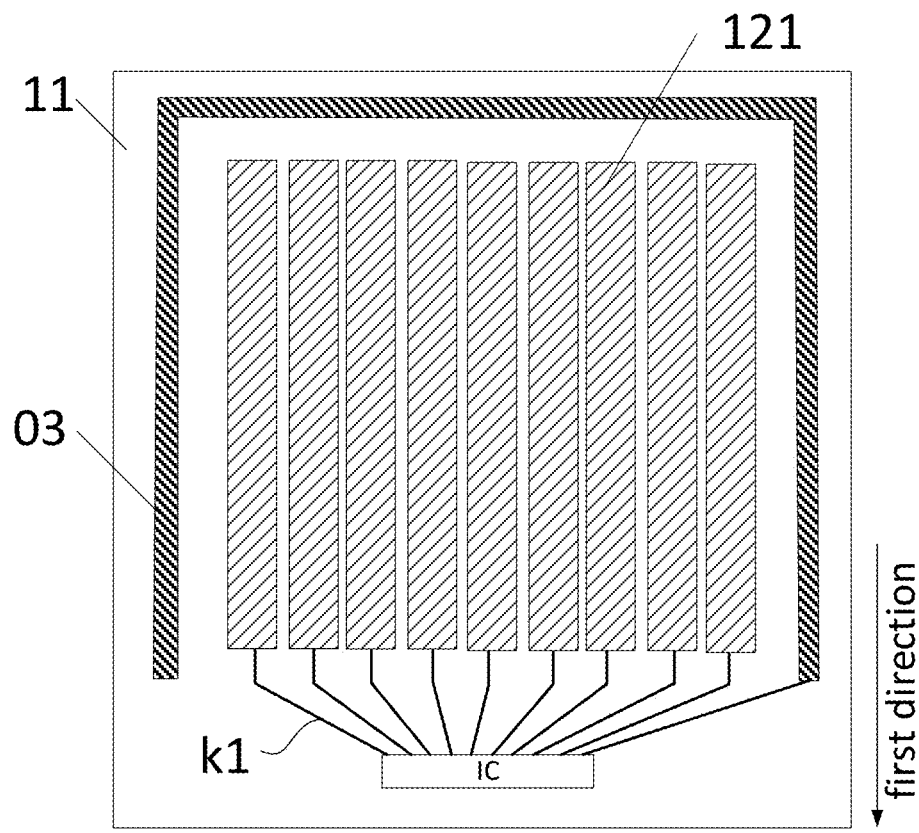
FIG. 3 is a top view illustrating a structure of a first electrode layer in a light adjusting device according to an embodiment of the present disclosure.
Figure 4:
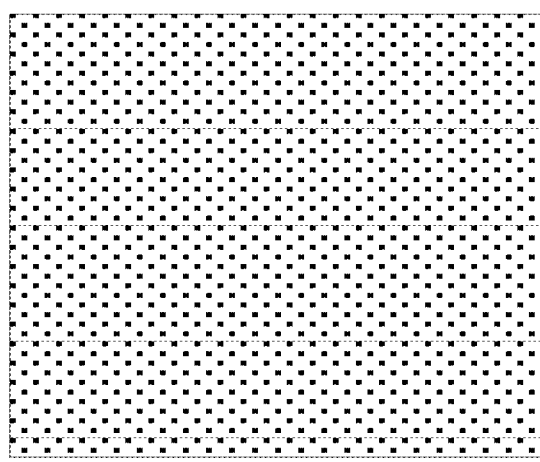
FIG. 4 is a top view illustrating a structure of a second electrode layer in a light adjusting device according to an embodiment of the present disclosure.

In some embodiments, as shown in FIGS. 3 and 4, the first electrode layer 12 may include a plurality of first strip electrodes 121 (as shown in FIG. 3) extending in the first direction (e.g., the vertical direction in FIG. 3), and the second electrode layer 22 may be a planar electrode (as shown in FIG. 4) covering the entire second base substrate 21. The first electrode layer 12 includes a plurality of first strip electrodes 121, and each of the first strip electrodes 121 covers a portion of the first light adjusting layer 3 in the direction perpendicular to the first base substrate 11, that is, the plurality of first strip electrodes 121 divide the smart glass into a plurality of regions in the direction perpendicular to the first base substrate 11. Each of the first strip electrodes 121 is coupled to one pin of the control unit IC via one signal line kl, so that each of the first strip electrodes 121 may be driven individually. In this way, different voltages may be applied to different first strip electrodes 121, so that different electric fields may be generated between the first strip electrodes 121 and the second electrode layer 22 (a planar electrode to which a common voltage may be applied) opposite to the first strip electrodes 121. In this way, the deflection angles of the liquid crystal molecules in the dye liquid crystal layer (i.e., the first light adjusting layer 3) at the regions corresponding to the first strip electrodes 121 are different, and further, the light transmittance of the first light adjusting layer at the regions corresponding to the first strip electrodes 121 of the smart glass are different, that is, the light transmittances of the first light adjusting layer 3 in different regions of the smart glass are different.

Similarly, in some embodiments, the second electrode layer 22 may also include a plurality of second strip electrodes, and the first electrode layer 12 is a planar electrode. In this case, different voltages may be applied to different second strip electrodes in the second electrode layer 22, so that different electric fields are generated between the second strip electrodes in the second electrode layer 22 and the first electrode layer 12 opposite to the second strip electrodes, so as to implement different light transmittances of the first light adjusting layer 3 in different regions of the smart glass.

Of course, in some embodiments, both the first electrode layer 12 and the second electrode layer 22 in each first glass module may include a plurality of strip electrodes, i.e., the first electrode layer 12 includes a plurality of first strip electrodes extending along the first direction, and the second electrode layer includes a plurality of second strip electrodes extending along the first direction. It should be noted at this point that the first strip electrodes in the first electrode layer 12 at least partially overlap with the second strip electrodes in the second electrode layer 22. In this case, the light transmittance of the first light adjusting layer 3 may be different in different regions of the smart glass by the above method.

As described above, in the present embodiment, at least one of the first electrode layer 12 and the second electrode layer 22 in each of the plurality of first glass modules may include a plurality of strip electrodes, and each of the strip electrodes is electrically coupled to the control unit IC via one signal line kl to be independently driven. In this case, the light transmittance of the first light adjusting layer 3 in different regions may be different. In addition, each of the plurality of first glass modules may include a plurality of first light adjusting layers tiled and arranged sequentially. With cooperation of the plurality of first light adjusting layers 3, more accurate control of the light transmittances of the smart glass in different regions may also be realized. Also, by controlling the areas of the strip electrodes (e.g., the first strip electrodes 121 in FIG. 3) in the first electrode layer 12 and/or the second electrode layer 22, the size of the light adjusting region may be controlled, and thus the light adjusting accuracy may be controlled.

It should be noted that, the first touch control sub-layer 4 is provided between the first base substrate 11 and the first electrode layer 12, which is not limited herein.

Figure 5:
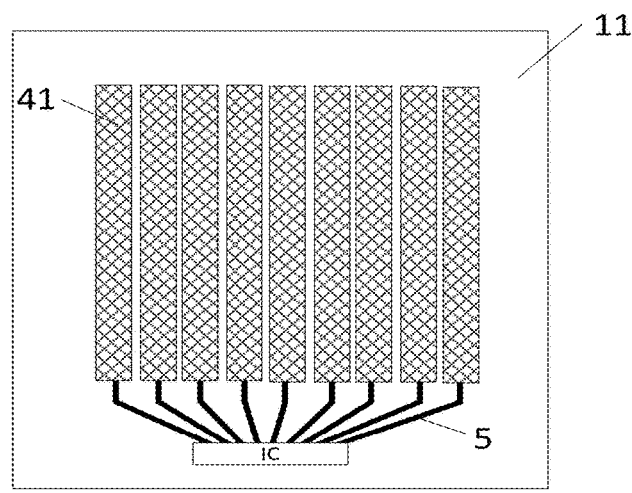
FIG. 5 is a top view illustrating a structure of a first touch control layer in a light adjusting device according to an embodiment of the present disclosure.

In some examples, as shown in FIGS. 1 to 5, if the first electrode layer 12 includes a plurality of first strip electrodes 121 extending along the first direction and the first touch control sub-layer 4 includes a plurality of first touch control electrodes 41, the first touch control electrodes 41 may also be strip electrodes extending along the first direction (as shown in FIG. 5). The first touch control electrodes 41 of strips correspond to the first strip electrodes 121 in a one-to-one correspondence, and an orthographic projection of each of the first touch control electrodes 41 on the first base substrate 11 overlaps with an orthographic projection of the first strip electrode 121 on the first base substrate 11. That is, the shape of the first touch control electrode 41 is the same as that of the first strip electrode 121, so that a same mask may be used when the first touch control electrode 41 and the first strip electrode 121 are formed, and the number of the processes using the mask is effectively reduced. Also, in this case, the touch control signal from one first touch control electrode 41 may be used to control the voltage of one first strip electrode 121, i.e., the number of the first touch control electrodes 41 is equal to the number of the first strip electrodes 121.

In some examples, an orthographic projection of one of the plurality of first touch control electrodes 41 on the first base substrate 11 or on the second base substrate 21 overlaps with an orthographic projection of more than one of the plurality of first strip electrodes 121 on the first base substrate 11 or on the second base substrate 21. That is, the number of the first touch control electrodes 41 is less than the number of the first strip electrodes 121, and multiple first strip electrodes 121 may be controlled by one first touch control electrode 41.

Figure 2:
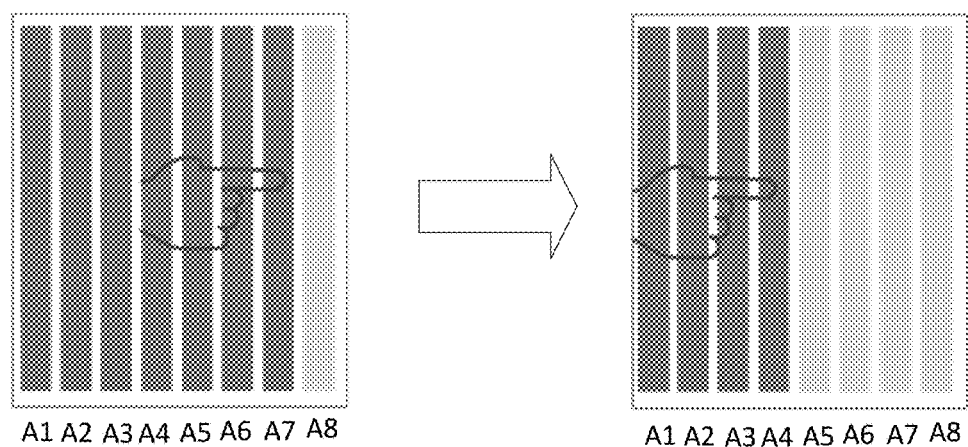
FIG. 2 is a schematic view illustrating touch control effect of a smart glass according to an embodiment of the present disclosure.

The smart glass provided by the embodiment may have various light adjusting modes. Specifically, in the case where the first touch control sub-layer 4 includes a plurality of first touch control electrodes 41, and the first electrode layer 12 includes a plurality of first strip electrodes 121, the corresponding relationship between the plurality of first touch control electrodes 41 and the plurality of first strip electrodes 121 may be preset in the control unit IC. For example, referring to FIG. 2, the following smart glass is taken as an example which includes one first glass module, the first touch control sub-layer 4 in the first substrate 1 in the first glass module has eight first touch control electrodes 4, and the first electrode layer 12 in the first substrate 1 in first glass module has eight first strip electrodes 121. The eight first touch control electrodes 41 shown in FIG. 2 are sequentially arranged as an example, and the smart glass may be set to be in a normally black mode (low light transmittance of the first light control layer 3) and a normally bright mode (high light transmittance of the first light control layer 3) by the control unit IC. The first touch control electrode 41 may be associated with the first strip electrode 121 at a position corresponding to the first touch control electrode 41. When a finger touches a certain first touch control electrode 41, the voltage of the first strip electrode 121 corresponding to the first touch control electrode 41 is changed, so that the liquid crystal molecules in the region corresponding to the first strip electrode 121 are switched from the normally black mode to the normally bright mode, or from the normally bright mode to the normally black mode. The eight first touch control electrodes in FIG. 2 are referred to as regions A1 to A8, and orthographic projections of the eight first strip electrodes on the first base substrate 11 overlap with orthographic projections of the eight first touch control electrodes on the first base substrate 11, respectively. As shown at the left side in FIG. 2, before touching and light adjusting, the region A8 of the first light adjusting layer 3 is in the normally bright state, and the regions A1 to A7 of the first light adjusting layer 3 are in the normally black state. Then, the finger slides from A7 to A4, namely, the finger has touched A7 to A5, and touch control signals from A7 to A5 are respectively transmitted to the control unit IC. The control unit IC changes the voltages of the first strip electrodes 121 corresponding to the positions A7 to A5, so that the first light adjusting layer 3 in the regions corresponding to A7-A5 are changed from the normally black state to the normally bright state (as shown at the right side in FIG. 2), and the light adjusting is realized by sliding. Certainly, the smart glass with a touch control function provided in the embodiment further has more light adjusting modes, which is not limited herein.

Figure 6:
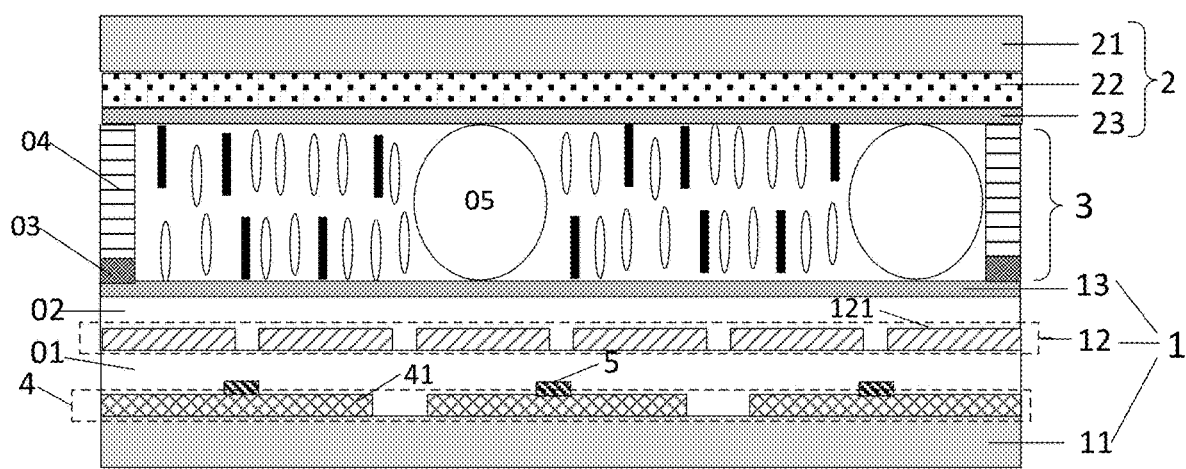
FIG. 6 is a cross-sectional view of a smart glass according to an embodiment of the present disclosure.

Of course, in some examples, as shown in FIG. 6, an orthogonal projection of the first touch control electrode 41 on the first base substrate 11 may not completely overlap with an orthogonal projection of the first strip electrode 121 on the first base substrate 11. For example, as shown in FIG. 6, an orthogonal projection of one first touch control electrode 41 on the first base substrate 11 may cover an orthogonal projection of two adjacent first strip electrodes 121 on the first base substrate 11. In this case, the touch control signal of one first touch control electrode 41 may control the voltages of two first strip electrodes 121 correspondingly (by the control unit IC). Specifically, the number of the voltages for controlling the first strip electrodes 121 corresponding to one first touch control electrode 41 may be determined according to the required touch precision, which is not limited herein.

The first touch control sub-layer 4 only between the first electrode layer 12 and the first base substrate 11 is taken as an example for the above description. However, in the present disclosure, the touch control layer 4 may be provided only between the second electrode layer 22 and the second base substrate 21, without a touch control layer 4 between the first electrode layer 12 and the first base substrate 11. Moreover, the touch control layer only between the second electrode layer 22 and the second base substrate 21 is similar to the first touch control sub-layer 4, and the description thereof is omitted.

Figure 7:
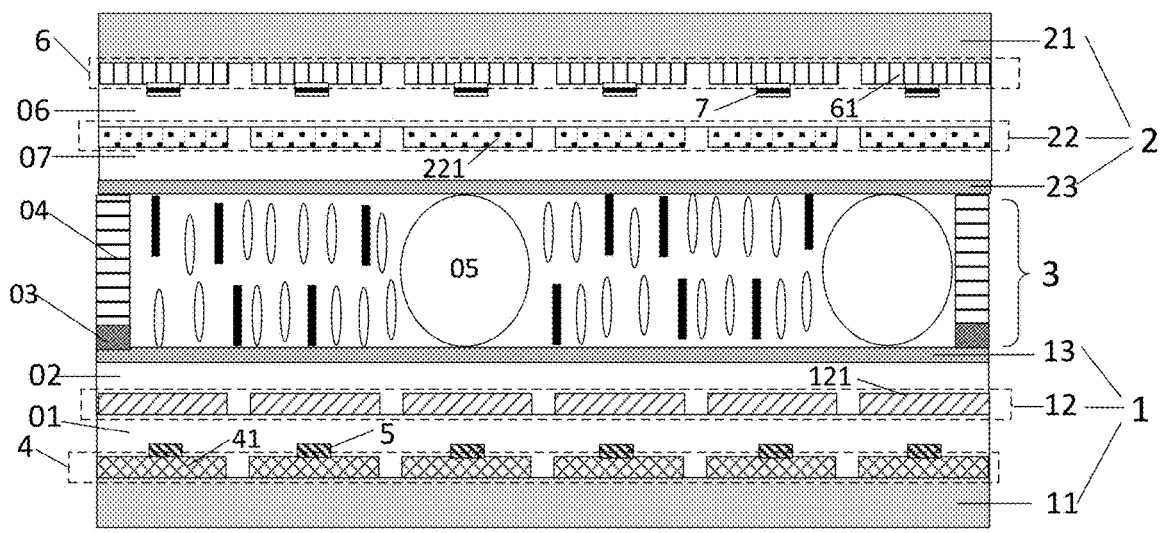
FIG. 7 is a cross-sectional view of a (double-sided touch control) smart glass according to an embodiment of the present disclosure.

In some examples, referring to FIG. 7, the smart glass provided in the embodiment may also be a double-sided touch control smart glass, that is, the smart glass further includes a second touch control sub-layer 6 in addition to the first touch control sub-layer 4. The second touch control sub-layer 6 is provided between the film layers of the second substrate 2 of the first glass module. The first touch control sub-layer 4 and the second touch control sub-layer 6 are opposite to each other, so that double-sided touch control of the smart glass may be realized.

Further, as shown in FIG. 7, similar to the first touch control sub-layer 4, the second touch control sub-layer 6 may also include a plurality of second touch control electrodes 61 arranged at intervals. The smart glass further includes a plurality of second touch control signal lines 7. The second touch control signal lines 7 are electrically coupled to the second touch control electrodes 61 in a one-to-one correspondence, and the second touch control signal lines 7 are provided on a side of the second touch control electrodes 61 proximal to the second electrode layer 22. The control unit IC is electrically coupled to the corresponding second touch control electrode 61 via the second touch control signal line 7, and one second touch control signal line 7 corresponds to one second touch control electrode 61. When a user touches a certain second touch control electrode 61, the touch control signal from the second touch control electrode 61 is transmitted to the control unit IC via the second touch control signal line 7 coupled to the second touch control electrode 61. The control unit IC is preset with a light adjusting action corresponding to the touch of each of the second touch control electrodes 61. The control unit IC may perform light adjusting on the first light adjusting layer 3 according to the preset light adjusting action corresponding to the touch control signal sent by the second touch control electrode 61.

Further, as shown in FIG. 7, the second electrode layer 22 includes a plurality of second strip electrodes 221 extending along the first direction, and the second touch control sub-layer 6 includes a plurality of second touch control electrodes 61 which may also be strip electrodes extending along the first direction. The second strip touch control electrodes 61 correspond to the second strip electrodes 221 in a one-to-one correspondence, and an orthographic projection of one second touch control electrode 61 on the second base substrate 21 overlaps with an orthographic projection of a corresponding second strip electrode 221 on the second base substrate 21. That is, the shape of the second touch control electrode 61 is the same as that of the second strip electrode 221, so that a same mask may be used when the second touch control electrode 61 and the second strip electrode 221 are formed, and the number of the processes using the mask is effectively reduced. In this case, the touch control signal of one second touch control electrode 61 may correspondingly control the voltage of one second strip electrode 221. Of course, the orthographic projection of the second touch control electrode 61 on the second base substrate 21 may not completely overlap with the orthographic projection of the second strip electrode 221 on the second base substrate 21, and the touch control signal of one second touch control electrode 61 may control the voltages of multiple second strip electrodes 221 (by the control unit IC). Specifically, the number of voltages for controlling the second strip electrodes 221 by one second touch control electrode 61 may be determined according to the required touch control precision, which is not limited herein.

In summary, assuming that the smart glass is a double-sided touch control glass which has the first touch control sub-layer 4 between the first base substrate 11 and the first electrode layer 12, and the second touch control sub-layer 6 between the second base substrate 21 and the second electrode layer 22, all the above four types of electrodes may be strip electrodes, that is, the first electrode layer 12 includes the plurality of first strip electrodes 121 extending along the first direction; the first touch control sub-layer 4 includes the plurality of first touch control electrodes 41 arranged at intervals, and the first touch control electrodes 41 are strip electrodes extending along the first direction; the second electrode layer 22 includes the plurality of second strip electrodes 221 extending along the first direction; and the second touch control sub-layer 6 includes the plurality of second touch control electrodes 61, and the second touch control electrodes 61 may also be strip electrodes extending along the first direction. The orthographic projections of the first strip electrodes 121, the first touch electrodes 41, the second strip electrodes 221 and the second touch control electrodes 61 on the first base substrate 11 overlap with each other. Therefore, a same mask may be adopted for forming the above four types of electrodes, and the number of the processes using the mask may be effectively reduced.

Optionally, referring to FIG. 1, and FIGS. 6 to 9, a first insulating layer 01 may be provided between the first touch control sub-layer 4 and the first electrode layer 12, and a second insulating layer 02 may be provided between the first electrode layer 12 and the first alignment layer 13. Referring to FIG. 7, the smart glass is a double-sided touch control glass, a fourth insulating layer 06 may be provided between the second touch control sub-layer 6 and the second electrode layer 22, and a third insulating layer 07 may be provided between the second electrode layer 22 and the second alignment layer 23. The above four insulating layers may be made of resin.

The present disclosure further provides another smart glass including at least one above first glass module and at least one second glass module. The at least one first glass module and the at least one second glass module may be stacked. Optionally, the at least one first glass module may include at least two first glass modules arranged in a stack, and the at least one second glass module may be arranged in a stack and between two adjacent first glass modules of the at least two first glass modules, i.e., the at least one second glass module is sandwiched between the two first glass modules. Optionally, the at least one first glass module includes one first glass module, the at least one second glass module is arranged in a stack and is on a side of the one first glass module. Of course, the at least one second glass module may be provided on a side of the at least one first glass module as a whole.

Optionally, each of the at least one second glass module may include a third substrate and a fourth substrate opposite to each other, and a second light adjusting layer between the third substrate and the fourth substrate. The second light adjusting layer is a dye liquid crystal layer, and each of the at least one second glass module does not include a touch control layer. That is, the second glass module may have the same structure as the first glass module except that the second glass module does not include the touch control layer. Further optionally, the second glass module may not include the first electrode layer and the second electrode layer, but only include the second adjusting layer identical to the first adjusting layer and the corresponding alignment layers.

Due to the fact that the touch control layer is required to be touched, the touch control layer of the smart glass is provided in the first substrate and/or the second substrate of the at least one first glass module exposed from the stacking of the at least one first glass module and the at least one second glass module, i.e., the touch control layer needs to be exposed to be touched. Due to the stacking, the base substrate, which is between two adjacent second glass modules and between the second glass module and the first glass module adjacent to each other, is shared.

Specifically, two first glass modules shown in FIG. 6 may be adopted. The two first glass modules are opposite to each other (that is, the respective touch control layers are at the outer sides of the two stacked first glass modules to ensure a good touch control sensitivity), multiple second glass modules may be stacked between the two opposite first glass modules, and the two exposed touch control layers 4 may serve as the first touch control sub-layer 4 and the second touch control sub-layer 6 of the double-sided touch control smart glass, as shown in FIG. 10.

Figure 8:
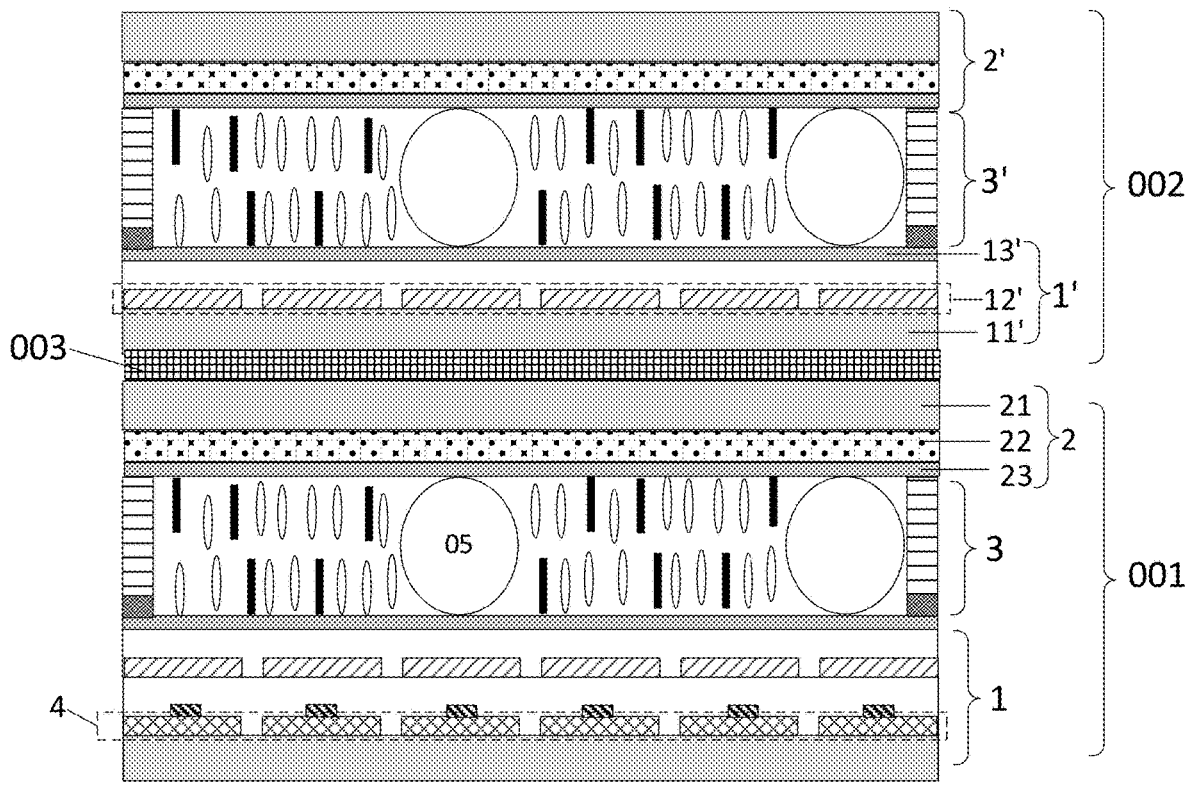
FIG. 8 is a cross-sectional view of a smart glass (including two glass modules) according to an embodiment of the present disclosure.

In some embodiments, referring to FIG. 8, the smart glass has a multi-layer glass structure, for example, the smart glass includes one first glass module and one second glass module stacked together. Among the stacked first glass module and second glass module, the base substrate of one of the stacked first glass module and second glass module is stacked with the base substrate of the other of the stacked first glass module and second glass module. Specifically, the second base substrate 21 of the first glass module and the third base substrate 11' of the second glass module may be integrated together by an adhesive layer 003. Taking the case that the smart glass includes the first glass module 001 and the second glass module 002 as an example, compared with the first glass module 001, the second glass module 002 has the same structure as the first glass module 001 except that the second glass module 002 does not include the touch control layer. The first glass module 001 includes a first substrate 1 and a second substrate 2 opposite to each other, and a first light adjusting layer 3 between the first substrate 1 and the second substrate 2. The second substrate 2 includes a second base substrate 21, and a second electrode layer 22 on a side of the second base substrate 21 proximal to the first substrate 1. A first touch control sub-layer 4 is provided between the first electrode layer 12 and the first base substrate 11 in the first substrate 1 of the first glass module 001. The second glass module 002 includes a third substrate 1' and a fourth substrate 2' opposite to each other, and a second adjusting layer 3' between the third substrate 1' and the fourth substrate 2'. The third substrate 1' includes a third base substrate 11' and a third electrode layer 12' on a side of the third base substrate 11' proximal to the fourth substrate 2'. The second base substrate 22 of the first glass module 001 and the third base substrate 11' of the second glass module 002 are adhered to each other by an adhesive layer 003 to form the smart glass. Ball spacers 5' are further included in the second light adjusting layer 3'.

Figure 9:
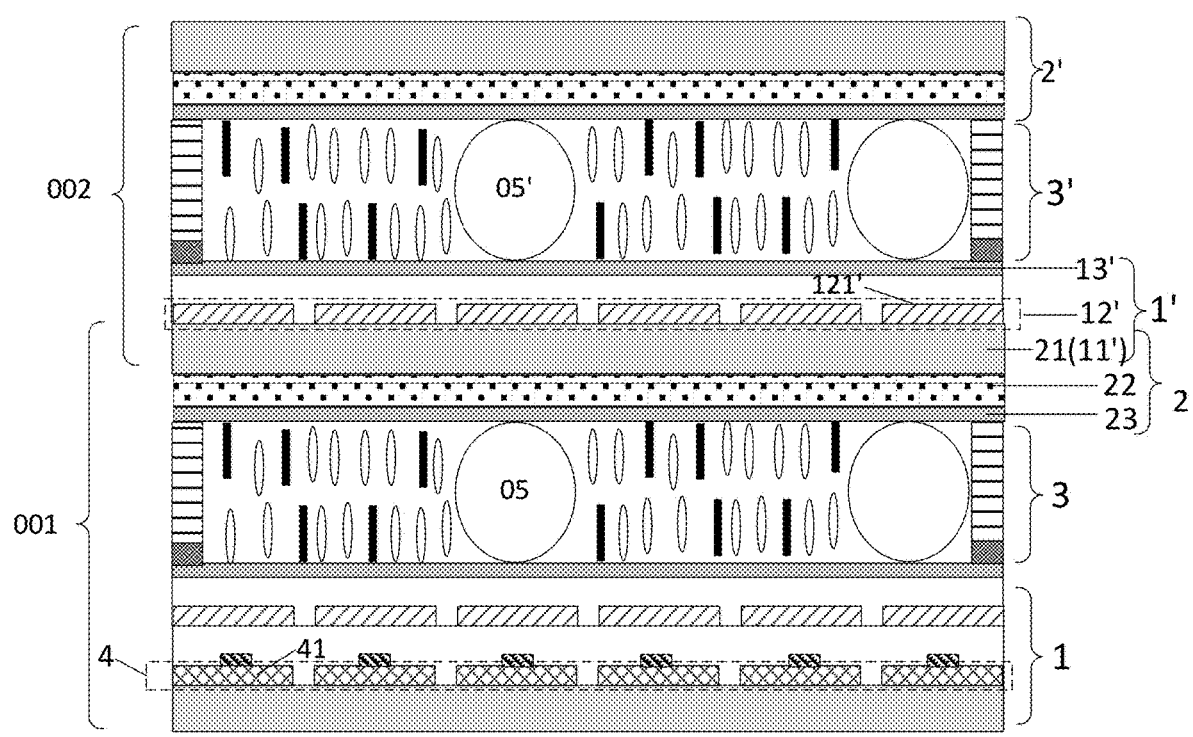
FIG. 9 is a cross-sectional view of a smart glass (including two glass modules with a common base substrate therebetween) according to an embodiment of the present disclosure.

Optionally, based on the above embodiments, referring to FIG. 9, the smart glass includes a plurality of glass modules, for example, including one first glass module and one second glass module stacked with each other. Among the stacked first glass module and second glass module, the base substrate of one of the stacked first glass module and second glass module is shared with the base substrate of the other of the stacked first glass module and second glass module. Taking the case that the smart glass includes the first glass module 001 and the second glass module 002 as an example, compared with the first glass module 001, the second glass module 002 has the same structure as the first glass module 001 except that the second glass module 002 does not include the touch control layer. As shown in FIG. 9, the second base substrate 22 of the first glass module 001 is shared with the third base substrate 11' of the second glass module 002, so as to reduce the thickness of the smart glass and the complexity of the manufacturing process thereof.

Figure 10:
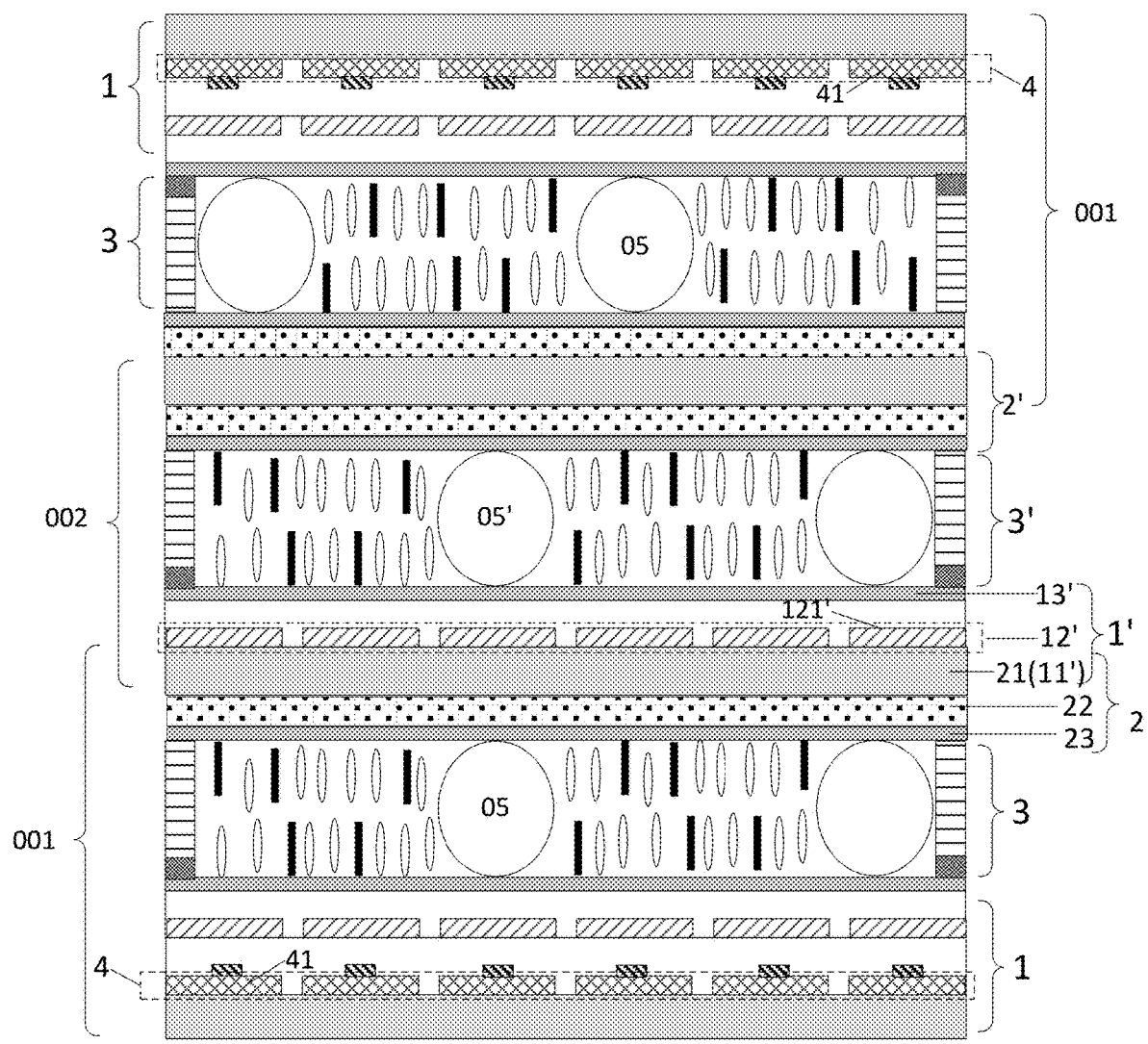
FIG. 10 is a cross-sectional view of a smart glass (including three glass modules with common base substrates therebetween) according to an embodiment of the present disclosure.

Optionally, based on the above embodiment, referring to FIG. 10, the smart glass includes a plurality of glass modules, for example, including two first glass modules stacked with each other and one second glass module between the two first glass modules. Taking the case that the smart glass includes two first glass modules 001 and one second glass module 002 as an example, the touch control layer may be provided in the first substrate 1 or in the second substrate 2 exposed from the two first glass modules 001.

Optionally, referring to FIG. 3, the smart glass has a light adjusting region having adjustable light transmittance and a non-light adjusting region, and the non-light adjusting region may further include a packaging sub region. The packaging sub region is arranged around the light adjusting region. The first light adjusting layer 3 is provided corresponding to the light adjusting region, that is, the region where the first light adjusting layer 3 is located defines the light adjusting region. The smart glass further includes a sealant 04 and a first transmission line 03. The sealant 04 is provided between the first substrate 1 and the second substrate 2 and corresponds to the packaging sub region. The sealant 04 is provided between the first substrate 1 and the second substrate 2 to facilitate the encapsulation of the dye liquid crystal layer (i.e., the first light adjusting layer 3), to prevent the overflow of liquid crystal molecules. The sealant 04 is provided with a conductive material, and the first transmission line 03 is arranged around the packaging sub region. The sealant 04 may be provided between the first transmission line 03 and the second electrode layer 22, that is, the sealant 04 may be provided on a side of the first substrate 11 proximal to the second substrate 21. One end of the first transmission line 03 is coupled to the control unit IC, and the other end of the first transmission line 03 is electrically coupled to the second electrode layer 22 via the conductive material in the sealant 04 to transmit a voltage to the second electrode layer 22, so that an electric field is generated between the first electrode layer 12 and the second electrode layer 22.

Optionally, in order to enable the smart glass to maintain high light transmittance, Indium Tin Oxide (ITO) may be used as a material for forming the electrodes of the first electrode layer 12, the second electrode layer 22, the first touch control sub-layer 4, and the second touch control sub-layer 6, and a plurality of metal materials, such as molybdenum (Mo), aluminum (Al), silver (Ag), Mo/Al/Mo, etc., may be used for forming the first touch control signal line 5, the second touch control signal line 7, and the first transmission line 03, which is not limited herein.

It should be noted that, the smart glass provided in the embodiment may alternatively drive the liquid crystal molecules in any other mode, such as ADS (Advanced Super Dimension Switch), IPS (In-Plane Switching) mode, and the like, which is not limited herein. In different modes, the number and the positions of the electrodes generating the electric field between the first substrate 1 and the second substrate 2 are changed accordingly. For example, in the ADS mode, the first electrode and the second electrode may be provided in the same substrate, which is not limited herein.

Figure 11:
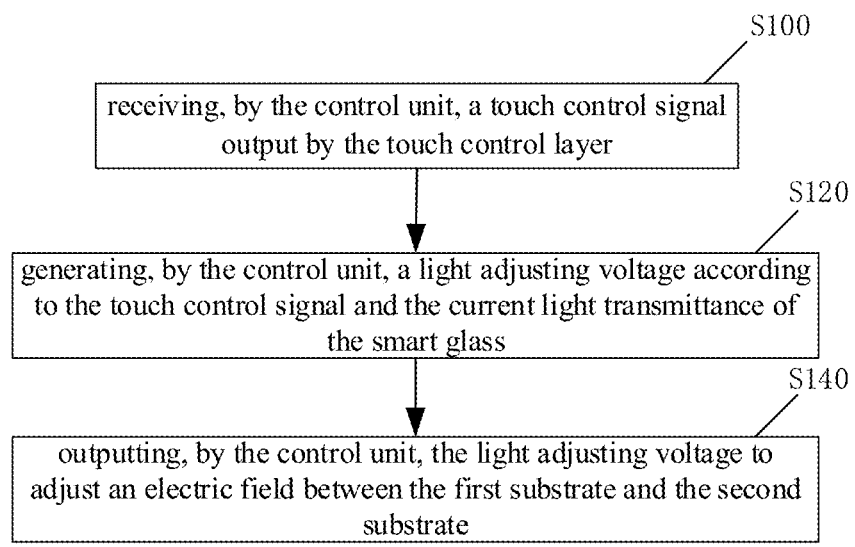
FIG. 11 is a flowchart illustrating a method for light adjusting of a smart glass according to an embodiment of the present disclosure.

According to another aspect of the present disclosure, a method for light adjusting of the above smart glass is provided. FIG. 11 is a flowchart of a method for light adjusting of a smart glass according to an embodiment of the present disclosure, and the method for light adjusting is described in detail below with reference to FIG. 11.

In step S100, the control unit IC receives the touch control signal output by the touch control layer 4. After the touch control layer 4 being touched, the touch control layer 4 generates a touch control signal and transmits the touch control signal to the control unit IC. The control unit IC receives the touch control signal.

In step S120, the control unit IC generates a light adjusting voltage according to the touch control signal and the current light transmittance of the smart glass. The touch control signal includes touch position information on the touch control layer 4, and the control unit IC stores in advance current light transmittance data of the light adjusting layer. The control unit IC may generate a light adjusting voltage for changing the current light transmittance of the light adjusting layer according to the touch position information and the light transmittance data of the light adjusting layer.

In step S140, the control unit outputs light adjusting voltages to adjust the electric field between the first substrate and the second substrate, thereby changing the current light transmittance of the light adjusting layer.

In some embodiments, the step of generating the light adjusting voltages by the control unit according to the touch control signal and the current light transmittance of the smart glass includes the following steps. Firstly, a touch position is determined according to the touch control signal. Then, the strip electrodes to which the light adjusting voltages are output are determined according to the touch positions and pre-set corresponding relationship between the touch positions and the positions of the plurality of strip electrodes (the plurality of first strip electrodes or the plurality of second strip electrodes). Finally, a different light adjusting voltage from the light adjusting voltage corresponding to the current light transmittance of the light adjusting layer in the region where the determined strip electrode is located is output according to the current light transmittance of the light adjusting layer in the region where the determined strip electrode is located.

According to another aspect of the present disclosure, a device for light adjusting of a smart glass is provided. The device includes a processor and a memory. The memory stores program instructions, and the processor executes the program instructions to execute the above method.

According to another aspect of the present disclosure, a device for light adjusting of a smart glass is provided. The device includes a receiving unit, a voltage generating unit, and an output unit. The receiving unit is configured to receive the touch control signal output by the touch control layer. The voltage generating unit is configured to generate the light adjusting voltage according to the touch control signal and the current light transmittance of the smart glass. The output unit is configured to output the light adjusting voltage to adjust the electric field between the first substrate and the second substrate.

In some embodiments, the voltage generating unit may further include a touch position determination sub-unit, an electrode driving sub-unit, and a light adjusting voltage generation sub-unit. The touch position determination sub-unit is configured to determine the touch position according to the touch control signal. The electrode driving sub-unit is configured to determine the strip electrodes to which the light adjusting voltage is output according to the touch positions and the pre-stored position relation between the touch positions and the positions of the plurality of first strip electrodes or the plurality of second strip electrodes. The light adjusting voltage generation sub-unit is configured to output a different light adjusting voltage from the light adjusting voltage corresponding to the current light transmittance of the light adjusting layer in the region where the determined strip electrode is located according to the current light transmittance of the light adjusting layer in the region where the determined strip electrode is located. For example, when the current light transmittance of the light adjusting layer corresponding to the region where the determined strip electrode is located makes the light adjusting layer in a bright state, the light adjusting voltage of the light adjusting layer corresponding to the region where the determined strip electrode is located may be changed to the light adjusting voltage corresponding to the light transmittance which makes the first light adjusting layer in a dark state.

According to another aspect of the present disclosure, a non-transitory computer storage medium having program instructions stored thereon is provided, and when the program instructions are executed on a computer, the computer is caused to execute the above method.

Correspondingly, the present disclosure further provides a method for manufacturing the smart glass. Taking the smart glass shown in FIG. 1 as an example, the method specifically includes the following steps.

In step S210, a plurality of first touch control electrodes 41 are formed on a first base substrate 11.

In step S220, a plurality of first touch control signal lines 5 are formed on the first base substrate 11, and the plurality of first touch control signal lines 5 are coupled to the plurality of first touch control electrodes 41 in a one-to-one correspondence.

In step S230, a first insulating layer 01 is formed on the first touch control signal lines 5 and the first touch electrodes 41.

In step S240, a first electrode layer 12 including a plurality of first strip electrodes is formed on the first insulating layer 01, while a second electrode layer 22 including a planar electrode covering then entire second base substrate 21 is formed on a second base substrate 21.

In step S250, a second insulating layer 02 is formed on the first electrode layer 12. PI (Polyimide) liquid is coated on the second insulating layer 02 and the second electrode layer 22, and is rubbed respectively, to form a first alignment layer 13 and a second alignment layer 23, respectively.

In step S260, a ball spacer material is sprayed between the first electrode layer 12 and the second electrode layer 22 to form ball spacers.

In step S270, a sealant 04 is coated on one of the first alignment layer 13 and the second alignment layer 23, liquid crystal molecules and dichroic dye molecules are mixed to form dye liquid crystal, and the dye liquid crystal is injected into a space formed by the sealant 04.

In step S280, the first substrate 11 and the second substrate 21 are aligned and assembled to form a smart glass.

It should be understood that the above embodiments are merely exemplary embodiments employed to illustrate the principles of the present disclosure, and the present disclosure is not limited thereto. It will be apparent to those skilled in the art that various changes and modifications can be made therein without departing from the scope of the disclosure as defined in the following claims, and these changes and modifications are to be considered within the scope of the disclosure.

What is claimed is:

1. A smart glass, comprising a first glass module, a touch control layer and a control unit; wherein
the first glass module comprises a first substrate and a second substrate opposite to each other, and a first light adjusting layer between the first substrate and the second substrate, wherein light transmittance of the first light adjusting layer is adjusted by an electric field between the first substrate and the second substrate;
the touch control layer is provided in at least one of the first substrate and the second substrate; and
the control unit is electrically coupled to the touch control layer to receive a touch control signal output by the touch control layer and adjust the electric field between the first substrate and the second substrate according to the touch control signal,
wherein the first substrate comprises a first base substrate and a first electrode layer on a side of the first base substrate proximal to the first light adjusting layer, the second substrate comprises a second base substrate and a second electrode layer on a side of the second base substrate proximal to the first light adjusting layer, and the first electrode layer and the second electrode layer are electrically coupled to the control unit, respectively, and
the touch control layer is between the first electrode layer and the first base substrate and/or between the second electrode layer and the second base substrate,
wherein the first electrode layer comprises a plurality of first strip electrodes extending along a first direction and/or the second electrode layer comprises a plurality of second strip electrodes extending along the first direction, and the plurality of first strip electrodes and the plurality of second strip electrodes are electrically coupled to the control unit, respectively,
wherein the touch control layer comprises a plurality of touch control electrodes arranged at intervals; and the smart glass further comprises a plurality of touch control signal lines;
the plurality of touch control signal lines are electrically coupled to the plurality of touch control electrodes in a one-to-one correspondence, the plurality of touch control electrodes are electrically coupled to the control unit via the plurality of touch control signal lines, and the number of the plurality of touch control electrodes is equal to or less than the number of the first strip electrodes and the number of the second strip electrodes.

2. The smart glass of claim 1, wherein
the first electrode layer comprises a first planar electrode completely covering the first base substrate, the second electrode layer comprises a second planar electrode completely covering the second base substrate, and the first planar electrode and the second planar electrode are respectively electrically coupled to the control unit; and
the touch control layer comprises a touch control electrode electrically coupled to the control unit.

3. The smart glass of claim 1, wherein an orthographic projection of one of the plurality of touch control electrodes on the first base substrate overlaps with an orthographic projection of at least one of the plurality of first strip electrodes on the first base substrate, and/or an orthographic projection of one of the plurality of touch control electrodes on the second substrate overlaps with an orthographic projection of at least one of the plurality of second strip electrodes on the second base substrate.

4. The smart glass of claim 1, wherein an orthographic projection of one of the plurality of touch control electrodes on the first base substrate overlaps with an orthographic projection of corresponding one of the plurality of first strip electrodes on the first base substrate, and/or an orthographic projection of one of the plurality of touch control electrodes on the second base substrate overlaps with an orthographic projection of corresponding one of the plurality of second strip electrodes on the second base substrate.

5. The smart glass of claim 4, wherein the first electrode layer comprises a plurality of first strip electrodes extending along the first direction, the second electrode layer comprises a planar electrode completely covering the second base substrate, and the touch control layer is between the plurality of first strip electrodes and the first base substrate.

6. The smart glass of claim 4, wherein the first electrode layer comprises a plurality of first strip electrodes extending along the first direction, the second electrode layer comprises a plurality of second strip electrodes extending along the first direction, the touch control layer comprises a first touch control sub-layer comprising a plurality of first touch control electrodes extending along the first direction and a second touch control sub-layer comprising a plurality of second touch control electrodes extending along the first direction, and the first touch control sub-layer is between the plurality of first strip electrodes and the first base substrate, and the second touch control sub-layer is between the plurality of second strip electrodes and the second base substrate.

7. The smart glass of claim 6, wherein orthographic projections of the plurality of first strip electrodes on the first base substrate or the second base substrate, orthographic projections of the plurality of second strip electrodes on the first base substrate or the second base substrate, orthographic projections of the plurality of first touch control electrodes on the first base substrate or the second base substrate, and orthographic projections of the plurality of second touch control electrodes on the first base substrate or the second base substrate overlap with each other in one-to-one correspondence.

8. The smart glass of claim 1, wherein
the first substrate further comprises:
a first insulating layer between the first electrode layer and the touch control layer;
a second insulating layer on a side of the first electrode layer proximal to the first light adjusting layer; and
a first alignment layer on a side of the second insulating layer proximal to the first light adjusting layer,
the second substrate further comprises:
a second alignment layer on a side of the second electrode layer proximal to the first light adjusting layer; and
the smart glass further comprises a spacer in the first light adjusting layer.

9. The smart glass of claim 1, further comprising a light adjusting region and a non-light adjusting region, wherein
the touch control layer is in the light adjusting region, and the control unit is in one of the first and second substrates and in the non-light adjusting region.

10. The smart glass of claim 9, further comprising a first transmission line and a sealant, wherein
the first transmission line and the control unit are both in one substrate of the first substrate and the second substrate, the first transmission line surrounds the corresponding electrode layer in the one substrate where the first transmission line is located, and the first transmission line is electrically coupled to the control unit; and
the sealant is between the first substrate and the second substrate and encapsulates the first light adjusting layer, and the sealant comprises a conductive material and is electrically coupled to the first transmission line and the corresponding electrode layer of the other substrate of the first substrate and the second substrate in which the first transmission line is not located.

11. The smart glass of claim 1, wherein the first light adjusting layer is a dye liquid crystal layer.

12. The smart glass of claim 1, wherein the plurality of touch control electrodes are made of indium tin oxide.

13. A smart glass, comprising at least one first glass module and at least one second glass module, wherein
each of the at least one first glass module comprises a first substrate and a second substrate opposite to each other, and a first light adjusting layer between the first substrate and the second substrate, wherein light transmittance of the first light adjusting layer is adjusted by an electric field between the first substrate and the second substrate;
the smart glass further comprises a touch control layer and a control unit, the touch control layer is provided in at least one of the first substrate and the second substrate; and the control unit is electrically coupled to the touch control layer to receive a touch control signal output by the touch control layer and adjust the electric field between the first substrate and the second substrate according to the touch control signal;
wherein the first substrate comprises a first base substrate and a first electrode layer on a side of the first base substrate proximal to the first light adjusting layer, the second substrate comprises a second base substrate and a second electrode layer on a side of the second base substrate proximal to the first light adjusting layer, and the first electrode layer and the second electrode layer are electrically coupled to the control unit, respectively, and
the touch control layer is between the first electrode layer and the first base substrate and/or between the second electrode layer and the second base substrate,
wherein the first electrode layer comprises a plurality of first strip electrodes extending along a first direction and/or the second electrode layer comprises a plurality of second strip electrodes extending along the first direction, and the plurality of first strip electrodes and the plurality of second strip electrodes are electrically coupled to the control unit, respectively,
wherein the touch control layer comprises a plurality of touch control electrodes arranged at intervals; and the smart glass further comprises a plurality of touch control signal lines;
the plurality of touch control signal lines are electrically coupled to the plurality of touch control electrodes in a one-to-one correspondence, the plurality of touch control electrodes are electrically coupled to the control unit via the plurality of touch control signal lines, and the number of the plurality of touch control electrodes is equal to or less than the number of the first strip electrodes and the number of the second strip electrodes, and
the at least one first glass module comprises at least two first glass modules stacked with each other, and the at least one second glass module is stacked with each other and is between two adjacent first glass modules of the at least two first glass modules, or
the at least one first glass module comprises one first glass module, and the at least one second glass module is stacked with each other and on a side of the first glass module,
wherein each of the at least one second glass module comprises a third substrate and a fourth substrate opposite to each other, and a second light adjusting layer between the third substrate and the fourth substrate, the second light adjusting layer is a dye liquid crystal layer, and each of the at least one second glass module does not comprise a touch control layer;
the touch control layer of the smart glass is in the first substrate and/or the second substrate of the at least one first glass module exposed from the stacked at least one first glass module and at least one second glass module; and the two adjacent second glass modules share a same base substrate, and the second glass module and the first glass module adjacent to each other, share a same base substrate.

14. A method for light adjusting of a smart glass, the smart glass comprising a first glass module, a touch control layer and a control unit; wherein the first glass module comprises a first substrate and a second substrate opposite to each other, and a first light adjusting layer between the first substrate and the second substrate, wherein light transmittance of the first light adjusting layer is adjusted by an electric field between the first substrate and the second substrate; the touch control layer is provided in at least one of the first substrate and the second substrate; and the control unit is electrically coupled to the touch control layer to receive a touch control signal output by the touch control layer and adjust the electric field between the first substrate and the second substrate according to the touch control signal, wherein the first substrate comprises a first base substrate and a first electrode layer on a side of the first base substrate proximal to the first light adjusting layer, the second substrate comprises a second base substrate and a second electrode layer on a side of the second base substrate proximal to the first light adjusting layer, and the first electrode layer and the second electrode layer are electrically coupled to the control unit, respectively, and the touch control layer is between the first electrode layer and the first base substrate and/or between the second electrode layer and the second base substrate, wherein the first electrode layer comprises a plurality of first strip electrodes extending along a first direction and/or the second electrode layer comprises a plurality of second strip electrodes extending along the first direction, and the plurality of first strip electrodes and the plurality of second strip electrodes are electrically coupled to the control unit, respectively, wherein the touch control layer comprises a plurality of touch control electrodes arranged at intervals; and the smart glass further comprises a plurality of touch control signal lines;

the plurality of touch control signal lines are electrically coupled to the plurality of touch control electrodes in a one-to-one correspondence, the plurality of touch control electrodes are electrically coupled to the control unit via the plurality of touch control signal lines, and the number of the plurality of touch control electrodes is equal to or less than the number of the first strip electrodes and the number of the second strip electrodes, and the method comprises the following steps:

receiving, by the control unit, the touch control signal output by the touch control layer;

generating, by the control unit, a light adjusting voltage according to the touch control signal and a current light transmittance of the smart glass; and outputting, by the control unit, the light adjusting voltage to adjust an electric field between the first substrate and the second substrate.

15. The method of claim 14, wherein generating, by the control unit, a light adjusting voltage according to the touch control signal and the current light transmittance of the smart glass comprises:

determining a touch position according to the touch control signal;

determining a strip electrode to which a light adjusting voltage is output according to the touch positions and preset position relation between the touch position and the positions of the plurality of first strip electrodes or the plurality of second strip electrodes; and generating a different light adjusting voltage from the light adjusting voltage corresponding to current light transmittance of the light adjusting layer in the region where the determined strip electrode is located according to the current light transmittance of the light adjusting layer in the region where the determined strip electrode is located.

16. A device for light adjusting of a smart glass comprising a processor and a memory, wherein the memory stores program instructions, and the processor executes the program instructions to perform the method of claim 14.

17. A non-transitory computer storage medium having program instructions stored thereon, wherein when the program instructions executed on a computer, the computer performs the method of claim 14.

* * * * *